US006543046B1

(12) United States Patent
Lunt

(10) Patent No.: US 6,543,046 B1
(45) Date of Patent: Apr. 1, 2003

(54) APPARATUS AND METHOD FOR NAVIGATING OBJECTS WITHIN A COMPUTER-IMPLEMENTED OBJECT ENVIRONMENT

(75) Inventor: Eric M. Lunt, Wheeling, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 08/504,733

(22) Filed: Jul. 20, 1995

(51) Int. Cl.⁷ .................................................. G06F 3/00
(52) U.S. Cl. ........................ 717/105; 717/113; 717/116; 345/810; 345/854
(58) Field of Search .............................. 395/155–161, 395/650, 700, 600, 326–358, 701–709

(56) References Cited

U.S. PATENT DOCUMENTS

| | | | | |
|---|---|---|---|---|
| 5,072,412 A | * | 12/1991 | Henderson, Jr. et al. | 395/159 |
| 5,283,898 A | * | 2/1994 | Kusumoto et al. | 395/650 |
| 5,295,242 A | * | 3/1994 | Mashruwala et al. | 395/161 X |
| 5,327,529 A | * | 7/1994 | Fults et al. | 395/333 |
| 5,335,320 A | * | 8/1994 | Iwata et al. | 395/155 |
| 5,414,809 A | * | 5/1995 | Hogan et al. | 395/155 |
| 5,432,903 A | * | 7/1995 | Frid-Nielsen | 395/161 |
| 5,537,630 A | * | 7/1996 | Berry et al. | 395/333 |
| 5,548,703 A | * | 8/1996 | Berry et al. | 395/160 |
| 5,548,749 A | * | 8/1996 | Kroenke et al. | 395/155 X |

OTHER PUBLICATIONS

Sametinger, "A Tool for the Maintenance of C++ Programs", IEEE, pp. 54–59, 1990.*

Jon Udell, "Componentware", Cover Story in *Byte*, May, 1994, pp. 46–56.

"The Interoperable Objects Revolution—How Component Software is Changing the Way You Program," Dr. Dobb's Special Report (complete issue), Winter 1994/95, vol. 19, Issue 16, pp. 1–72.

* cited by examiner

Primary Examiner—John Breene
Assistant Examiner—S R Pannala
(74) Attorney, Agent, or Firm—Merchant & Gould P.C.

(57) ABSTRACT

A system is provided for navigating at least one object within a computer-implemented object environment. The system specifies at least one object having particular attributes. An object environment is displayed which includes representations of the object and the corresponding particular attributes. Each of the attributes are associated with a navigation index, which the system displays in order to list the particular attributes. Upon receiving an indication of a user-specified attribute within the navigation index, the system provides a visual indication of a location of the user-specified attribute within the displayed object environment.

2 Claims, 11 Drawing Sheets

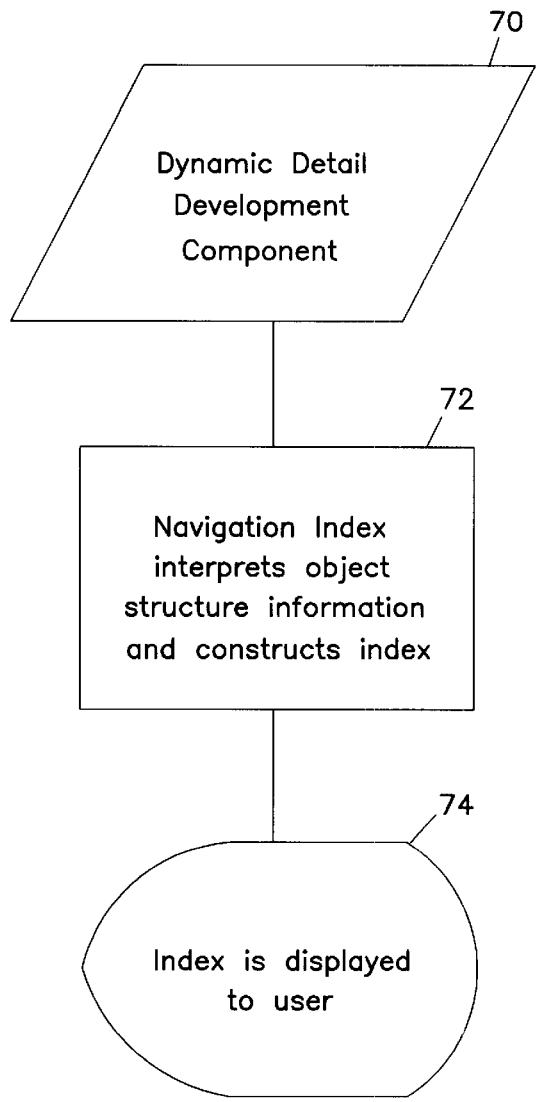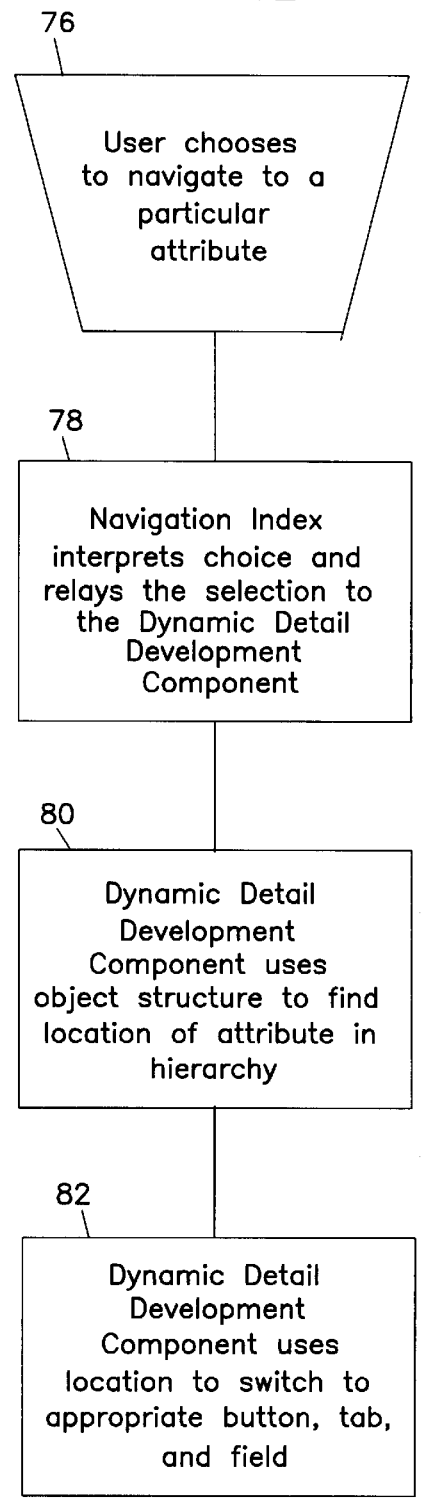

APPARATUS AND METHOD FOR NAVIGATING OBJECTS WITHIN A COMPUTER-IMPLEMENTED OBJECT ENVIRONMENT

FIELD OF THE INVENTION

The present invention relates to an apparatus and method for locating and displaying identification of objects within a computer-implemented object environment.

BACKGROUND OF THE INVENTION

Object-oriented programming (OOP) is a process of developing computer software using objects, including the steps of analyzing the problem, designing the system, and constructing the program. An object is a software package that contains both data and a collection of related procedures. Since it contains both data and procedures, it can be visualized as a self-sufficient component that does not require other additional procedures or data to perform its specific task. OOP, therefore, views a computer program as a collection of largely autonomous components, called objects, each of which is responsible for a specific task. This concept of packaging data and procedures together in one component or module is called encapsulation.

Components, in general, are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture.

It is worthwhile to differentiate between an object and a class of objects. An object is a single instance of the class of objects, which is often just called a class. A class of objects can be viewed as a blueprint, from which many objects can be formed. In the following discussion, the term object refers to a class of objects and all possible objects that can be formed from the class.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object; it inherits all the aspects of the object representing the piston engine and adds further limitation or detail to it. The object representing the ceramic piston engine "depends from" the object representing the piston engine. The relationship between these objects is called inheritance.

With the concepts of composition-relationship, inheritance and encapsulation, an object can represent just about anything in the real world. In fact, a person's logical perception of reality is the only limit on determining the kinds of things that can become objects in object-oriented software. Some typical categories are as follows: Objects can represent physical objects, such as automobiles in a traffic-flow simulation, electrical components in a circuit-design program, countries in an economics model, or aircraft in an air-traffic-control system. Objects can represent elements of the computer-user environment such as windows, menus or graphics objects. An object can represent an inventory, such as a personnel file or a table of the latitudes and longitudes of cities. An object can represent user-defined data types such as time, angles, and complex numbers, or point on the plane.

With this enormous capability of the object to represent just about any logically separable matters, OOP allows the software developer to design and implement a computer program that is a model of some aspects of reality, whether that reality is a physical entity or a process. Since the object can represent anything, the software developer can create an object which can be used as a component in a larger software project in the future.

If 90% of a new software consists of proven, existing components made from the preexisting reusable objects, then only the remaining 10% of the new software project has to be written and tested from scratch. Since 90% already came from an inventory of extensively tested reusable objects, the potential domain from which an error could originate is 10% of the program. As a result, OOP enables the software developers to build objects out of other objects, which in turn may have been built out of earlier objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased-speed of its development.

In order for OOP to truly flourish, programming languages must fully support the OOP principles, such as encapsulation, inheritance and composition-relationship. With the advent of the C++ programming language, many commercial software developers have embraced QOP. C++ is an OOP language that offers a fast, machine-executable code, and that is suitable for both commercial-application and systems-programming projects. For now, C++ appears to be the most popular choice among many programmers, but there is a host of other OOP languages, such as the SMALLTALK, COMMON LISP OBJECT SYSTEM (CLOS), and EIFFEL programming languages. Additionally, the OOP capabilities are being added on to the existing popular computer programming languages such as the PASCAL programming language.

In addition, for OOP to be truly effective in the future, all reusable objects must be readily accessible to interested parties. This will require an object-oriented database, which may consist of a collection of smaller databases. At minimum, such database should be based on an intelligent classification system and should support search methods that allow an interested party to search and access the database using the open standard, which is necessary to accommodate software developers using different OOP languages and different interfaces.

Ideally, this database will allow an interested party to search and access an object, a class of objects, a class library of objects and a framework of class libraries of objects. In this scheme, an object will be the smallest unit of search. A class of objects can be viewed as a template of such an object, similar to a blueprint, from which many instances of classes are logically related to each other in order to perform a complicated task that a single object or a single class cannot perform. A framework of class libraries is even more complex. It will consist of significant collections of collaborating classes that capture both the small scale patterns and major mechanisms that implement the common requirements and design in a specific application domain.

Further, OOP principles ideally should be extended such that individual developers can modify the operations of shared components at run-time without changing the software code of the components themselves. This will allow larger and more complex shared components to be developed and individually tailored to a particular customer's needs by the software developer. At the same time, this will minimize the need to develop specialized components for each individual customer that provide substantially the same functions. For example, a single component having spell checking functions can be developed and individually tailored for use in a word processor, presentations package, accounting system, point of sale system, or the like. Significantly, such a component need only be developed and debugged one time.

Objects also have one or more properties. A collection of objects may therefore have many different properties. These properties can be displayed on a computer screen. However, it can be difficult for a user to locate and view a particular property among these objects. This is particularly true when many objects are displayed in several levels or groups, such that a user would typically be required to search through the levels and multiple objects in order to locate a particular property.

SUMMARY OF THE INVENTION

This invention is a system and method for navigating at least one object within a computer-implemented object environment. The system electronically specifies at least one object having particular attributes. An object environment is displayed, including representations of the object and the corresponding particular attributes. Upon selection by a user, the system provides a visual indication of a location of a user-specified attribute within the displayed object environment.

BRIEF DESCRIPTION OF THE DRAWINGS

FIG. 11 is a flow chart illustrating how a navigation index constructs an index of attributes for display to a user.

FIG. 12 is a flow chart illustrating operation of a system for indicating-a-location-of-an attribute.

DETAILED DESCRIPTION

The present invention may be implemented within a computer in order to provide an apparatus and method for identifying object attributes selected by a user. Typically, a user first selects a particular attribute, and then the apparatus and method automatically displays a location of that attribute within an object environment. An example of an implementation of the present invention is also referred to as "indexed tabs."

Definitions

A "business object" is an object oriented representation of a functional business entity, represented as a class in the SMALLTALK programming language. Each object has data and behaviors that are related to the business domain. Examples of business objects include a customer object and an account object.

An "attribute" is a piece of data that is associated with an instance of a business object. It is the composition of the attributes with appropriate behaviors that defines a business object. An example of an attribute on a customer object would be name or address.

An "attribute descriptor" specifies "meta-information" about an attribute on a business object. This meta-information typically includes data type, label, default UI widget, default category, and simple validation rules. For example, the attribute descriptor for a name on a customer may specify that it is a string, with label "Name," using an input box, in the default category "General Information."

Object Structures

An object structure defines a hierarchical grouping of attributes on a business object. The attributes of a business object are often organized into functional groupings that reflect the use of that business object in a particular setting. These groupings can be nested into a hierarchy, with an attribute (and its corresponding attribute descriptor) at each of the "leaves."

Figure 1:
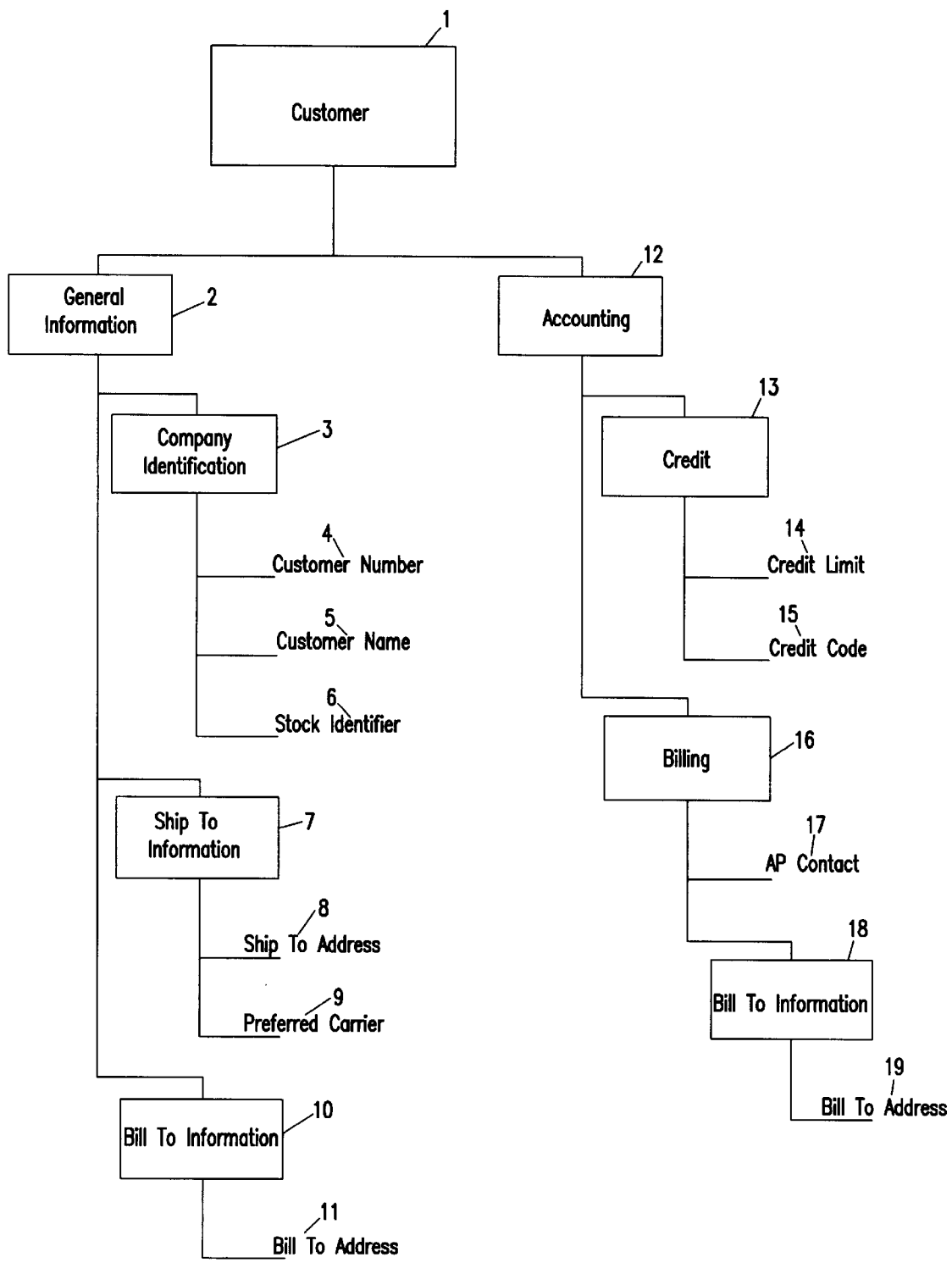
FIG. 1 is an example of an object structure for a "Customer" business object.

An example of an object structure for the business object "Customer" 1 is shown in FIG. 1. Each node 2, 12 represents an attribute on the Customer object 1 with an appropriate attribute descriptor. The node 2 for "general information" includes groups for company identification 3, ship-to information 7, and bill-to information 10. The group for company identification 3 includes leaves for customer number 4, customer name 5, and stock identifier 6. The group for ship-to information 7 includes leaves for ship-to address 8 and preferred carrier 9. The group for bill-to information 10 includes a leaf for bill-to address 11.

The node 12 for "accounting" includes groups for credit 13, billing 16, and bill-to information 18. The group for credit 13 includes leaves for credit limit 14 and credit code 15. The group for billing 16 includes a leaf for AP contact 17. The group for bill-to information 18 includes a leaf for bill-to address 19.

Each of these groups contains attributes as specified in FIG. 1 The attributes that are appropriate for this particular representation are grouped under at least one functional group. This grouping of attributes into a functional-based hierarchy is called an object structure. A business object can have zero to many object structures associated with it.

Each group or attribute in an object hierarchy is called a node. The following are additional properties associated with nodes that are stored with the object structure. First, visibility: Under what conditions is this node (and all its sub-nodes) visible. There are typically three possible values: always (the node is always visible), never (the node is always invisible), and rule-based (the node is visible if a rule evaluated against the business object returns true). Second, Name: For nodes that represent a grouping, what is the name of the group. Third, Task Event: For nodes that represent a grouping, what task event should be posted if the group is selected in a card-file widget. Fourth, Flatten: For nodes that represent attributes that themselves refer to other business objects, should the attributes of the contained business object be included in this object structure. For example, if the attribute called "ship-to address" on a customer business object contains an Address business object, individual attributes associated with the Address object (street, city, zip, etc.) may be included in the Customer object structure.

The following describes benefits of hierarchical groupings. Object structures allow a single grouping specification to be used in multiple places in an application, increasing the consistency in presenting the business object to the user. The flexibility in representing the object structure to the user also aids the user to interact with the business object in a consistent manner.

Figure 2:
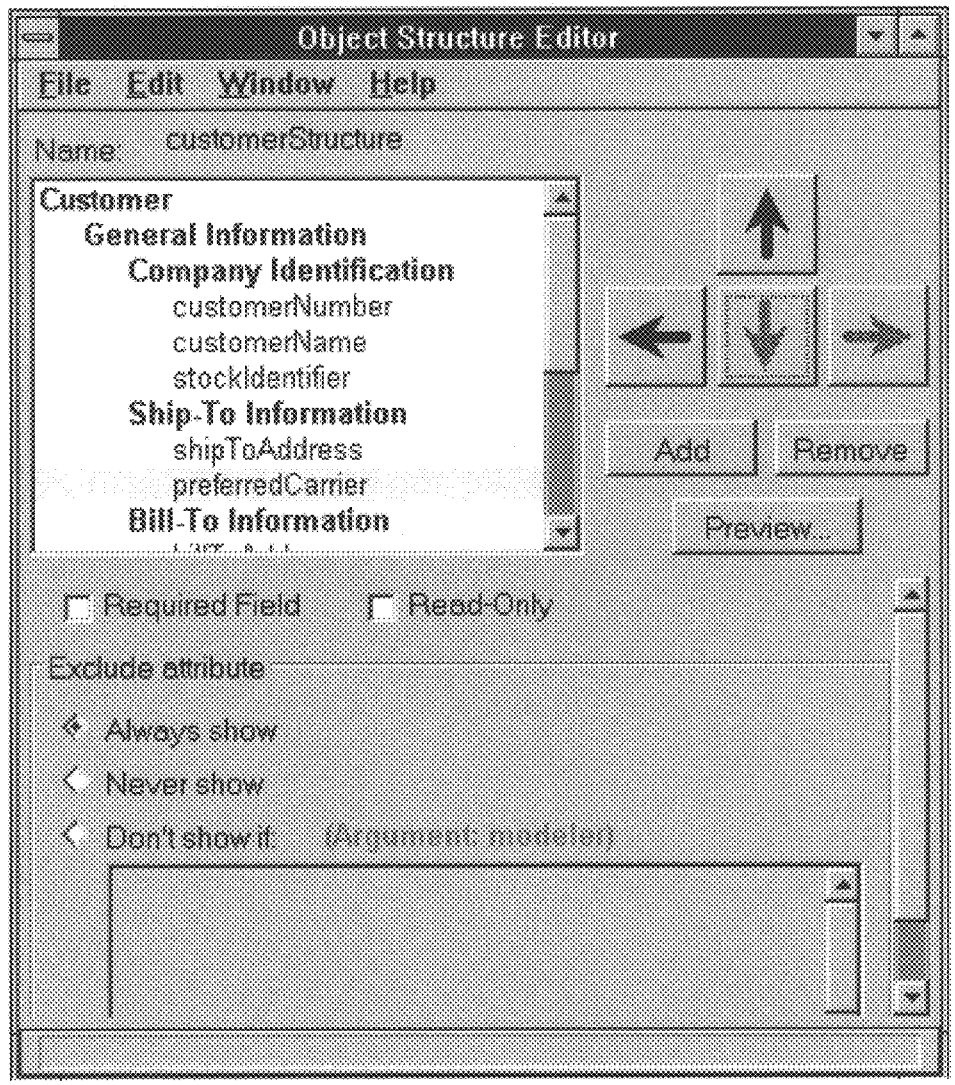
FIG. 2 is an example of a user interface for an object structure editor.

An object structure is specified using the "object structure editor." This tool provides an interface to construct object structures and associate them with business objects. FIG. 2 is an example of a user interface to maintain these object structures. Internally, object structures are stored as an encapsulated hierarchy of nodes, with each node having the variability described above, as well as an identifier. An object structure has an identifier as well as an business object class associated with it, which means it has a key comprising two attributes: identifier and class name.

Detail Development Component

A detail development component is a development component that is responsible for representing the details of an instance of a business object in a form-like manner. It also handles a number of standard database interaction protocols associated with a business object and is responsible for showing the end-user a meaningful representation of a business object. This means that the development component displays and allows modification of the state of the business object.

The detail development component typically has two different styles: hand-crafted and dynamic. The hand-crafted style requires a view of the business object to be "painted."

The dynamic style of the detail development component constructs a view of a business object not from a developer painted "canvas," but rather from a specification of the object being displayed. This specification is primarily an object structure as described above. Given the groupings of attributes on the business object and their associated attribute descriptors (which includes the label and widget to use when representing the attribute), the development component is able to algorithmically construct a user interface.

The following are a number of benefits to dynamically constructing a user interface instead of having one painted.

Consistency—each time the user is presented with a view of a business object, even in different contexts, the user is presented with a consistent interface and logical attribute groupings.

Conformance to standards—a consideration in a large application is making all interfaces consistent with respect to user interface layout standards. This includes such properties as screen margins, widget width and spacing, label and widget gutter space. By dynamically generating an interface, a system can guarantee standards conformance, even if the standards change.

Encapsulation—if a change is made to the business object itself, all representations of the business object are updated by simply updating the object structure. If, on the other hand, the representations for the business object were painted, each "canvas" would have to updated manually, which is a labor-intensive, error-prone process.

If the dynamic style of the detail development component is used, the developer should specify two pieces of information for correct interface to be constructed: an object structure and a representation.

The representation chosen affects how the hierarchical groupings are displayed to the user, as well as the effective depth of grouping. The following are three possible representations.

Figure 3:
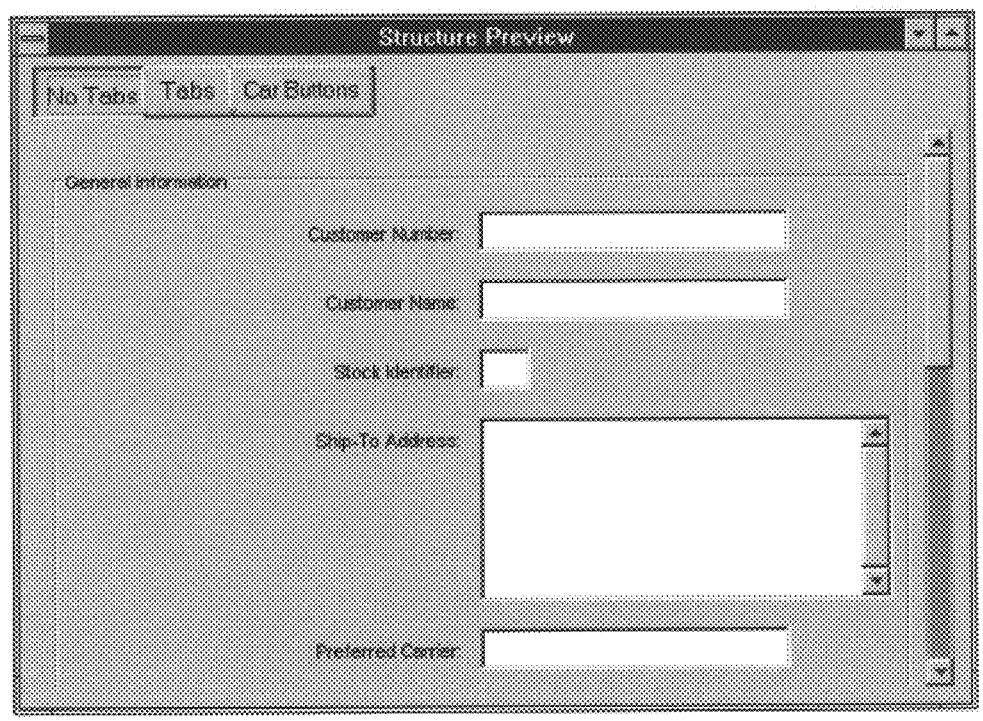
FIG. 3 shows a representation of a dynamic detail development component depth of one (group boxes).

Group boxes only—this representation has an effective depth of one, meaning that it can display one level of grouping. It represents this grouping by using a group box. For the customer object example, if this representation was chosen there would be two group boxes displayed, "general information" (which would contain the attributes customer number, customer name, stock identifier, ship-to address, preferred carrier, and bill-to address) and "accounting" (which would contain the attributes credit limit, credit code, AP contact, and bill-to address). FIG. 3 shows a representation of the dynamic detail development component depth of one (group boxes only).

Figure 4:
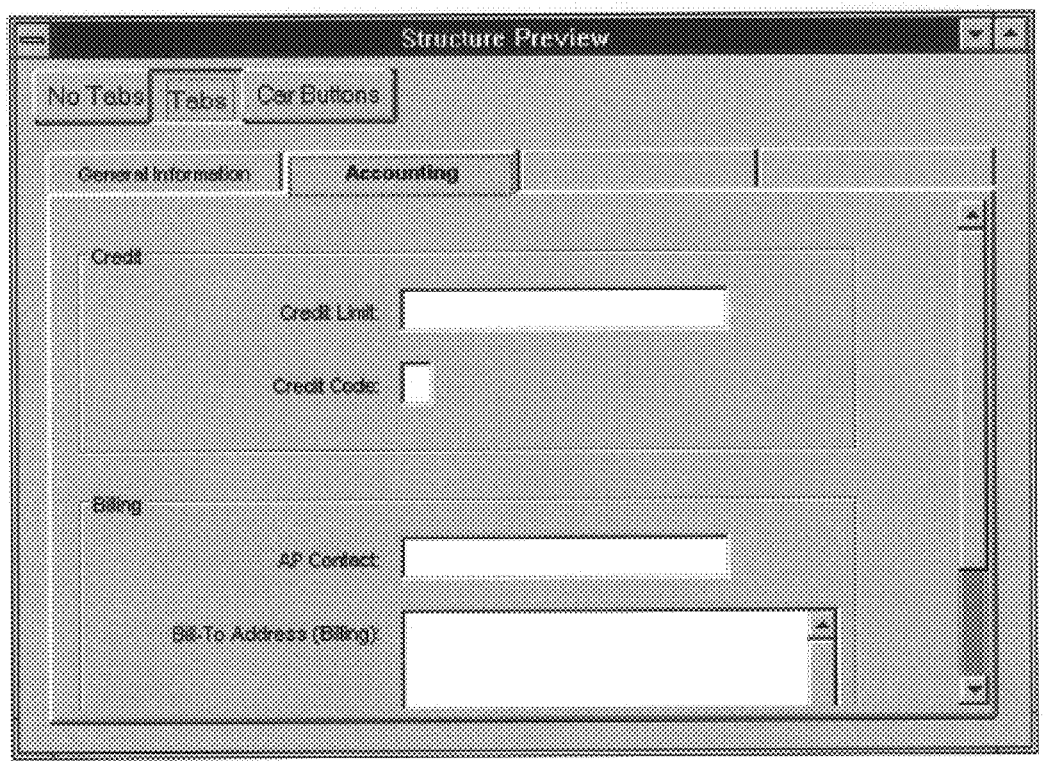
FIG. 4 shows a representation of a dynamic detail development component depth of two (tabs and group boxes).

Tabs and group boxes—this representation has an effective depth of two, meaning that it can display two levels of grouping. It represents the outer-most grouping by using the "card-file" metaphor, where each tab represents a page. Within each tab, group boxes are used to show the second level of grouping. For the customer object example, if this representation was chosen there would be a card-file widget with two pages, "general information" and "accounting." The "general information" page would have three group boxes labeled "company information" (which would contain the attributes customer number, customer name, and stock identifier), "ship-to information" (which would contain the attributes ship-to address and preferred carrier), and "bill-to information" (which would contain the attribute bill-to address). The "accounting" page would have two group boxes labeled "credit" (which would contain the attributes credit limit and credit code) and "billing" (which would contain the attributes AP contact and bill-to address). FIG. 4 shows a representation of the dynamic detail development component depth of two (tabs and group boxes).

Figure 5:
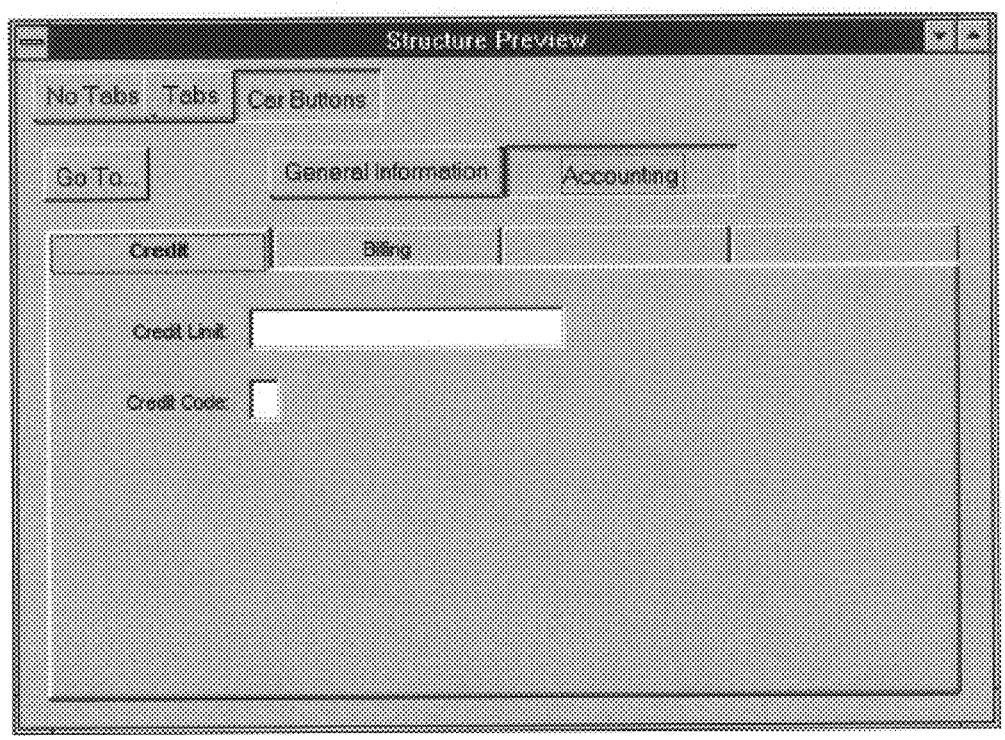
FIG. 5 shows a representation of a dynamic detail development component depth of three (car radio buttons, tabs, and group boxes).

Car radio buttons, tabs and group boxes—this representation has an effective depth of three, meaning that it can display three levels of grouping. It represents the outer-most grouping by using the "car radio buttons" metaphor, where each button represents a macro group. Each car button has a different set of tabs associated with it, which represents the second level of grouping. Within each tab, group boxes are used to show the third level of grouping. For the customer object example, if this representation was chosen there would be two car radio buttons labeled "general information" and "accounting." When the "general information" button is selected, a card-file with three pages would be displayed. These pages would be labeled "company information" (which would contain the attributes customer number, customer name, and stock identifier), "ship-to information" (which would contain the attributes ship-to address and preferred carrier), and "bill-to information" (which would contain the attribute bill-to address). When the "accounting" button is selected, a card-file with two pages would be displayed. These pages would be labeled "credit" (which would contain the attributes credit limit and credit code) and "billing" (which would contain the attributes AP contact and a group box labeled "bill-to information" that contained the attribute bill-to address). FIG. 5 shows a representation of the dynamic detail development component depth of three (car radio buttons, tabs, and group boxes).

Figure 6:
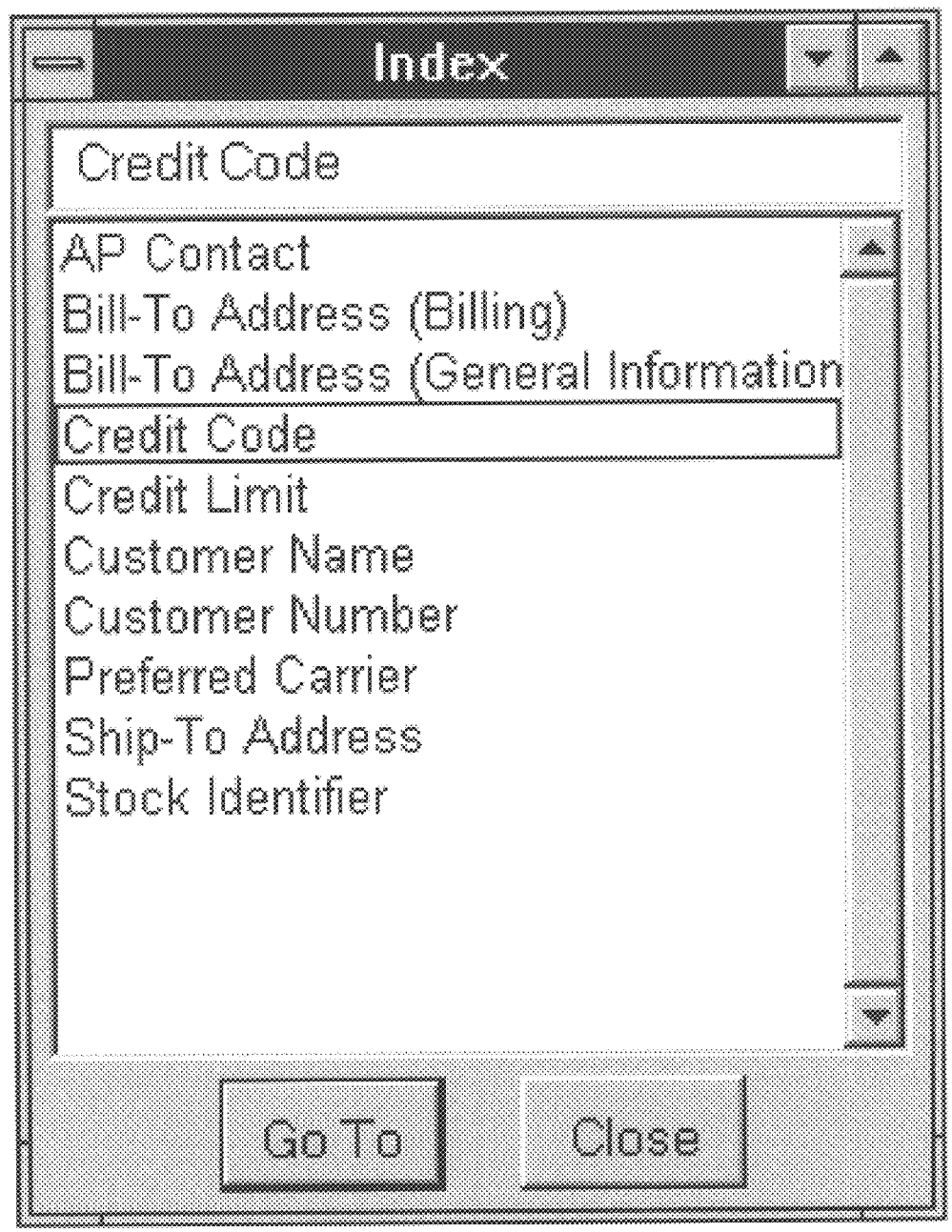
FIG. 6 shows a user interface for a navigation index.

The screens or user interfaces shown in FIGS. 3–5 preferably have additional "preview" buttons at the top of the window that are not present at run-time. A "Go To" button shown in FIG. 5 will automatically launch a navigation index, which is shown in FIG. 6.

Indexed Tabs Operation

While the hierarchical grouping of attributes on a business object is often a useful representation, the user may want to find an attribute directly, without considering where it exists in the interface (i.e., in which tab the attribute exists). A navigation index addresses the need to support both conflicting navigational strategies. The user can preferably at any time bring up a modeless navigation index, which displays all of the attributes in a list in alphabetical order or some other order, or in predetermined categories. By selecting ("clicking on") the attribute and then selecting a "Go to" button, the appropriate attribute is highlighted, regardless of what tab it appears on. In particular, the detail development component automatically chooses the correct car button and card-file tab to select to make the attribute appear.

Figure 7:
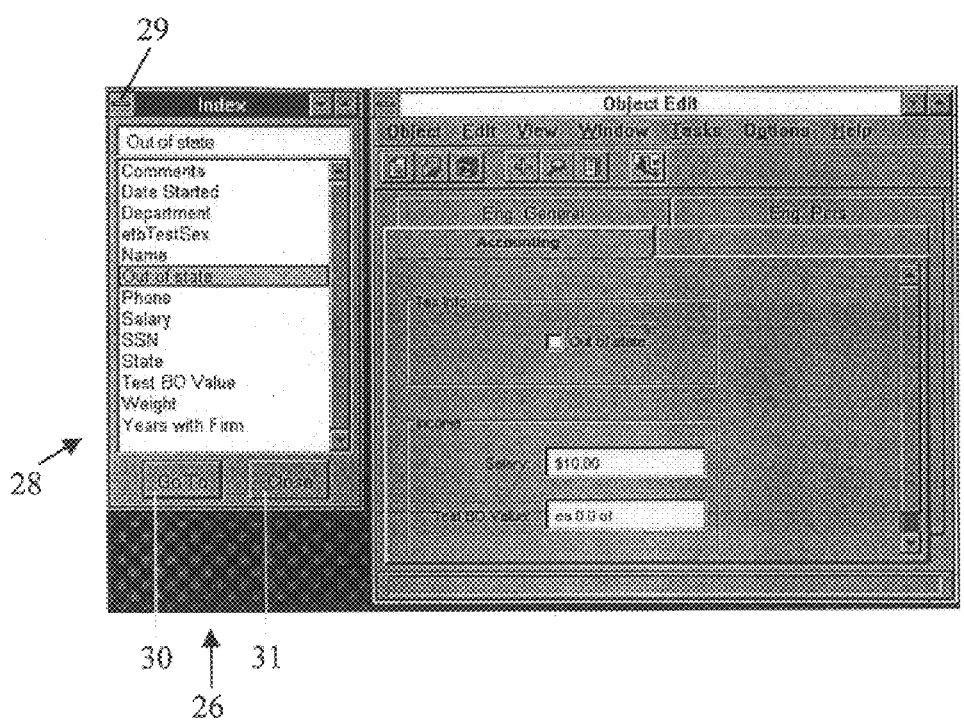
FIG. 7 is an example of a user interface for implementing the present invention.

FIG. 7 is an example of a user interface 26 which illustrates this feature. A user selects an attribute in a navigation index 28. In this example, a user has selected "out of state." When the user selects the "Go to" button 30, the system automatically illustrates a location 32 of the selected attribute in the displayed object environment. In this example, the system has placed a dashed box around "out of state" in order to illustrate its location. Other methods of illustrating locations of attributes are possible, such as: highlighting the attribute, drawing a solid box around the attribute, or displaying the attribute in a different color or shade in comparison to the background.

The user can also selectively instruct the system to display the navigation index 28. This is typically accomplished by selecting the "close" button 31 to close the navigation index 28, and selecting an "open" command on menu bar 29 to open the navigation index 28.

An implementation of a navigation index takes advantage of the information in the object structure that is already present for the dynamic construction of the interface. With the object structure, the navigation index knows all the attributes and their locations in the user interface. The tool works with the detail development component to perform the appropriate actions in the user interface.

Figure 8:
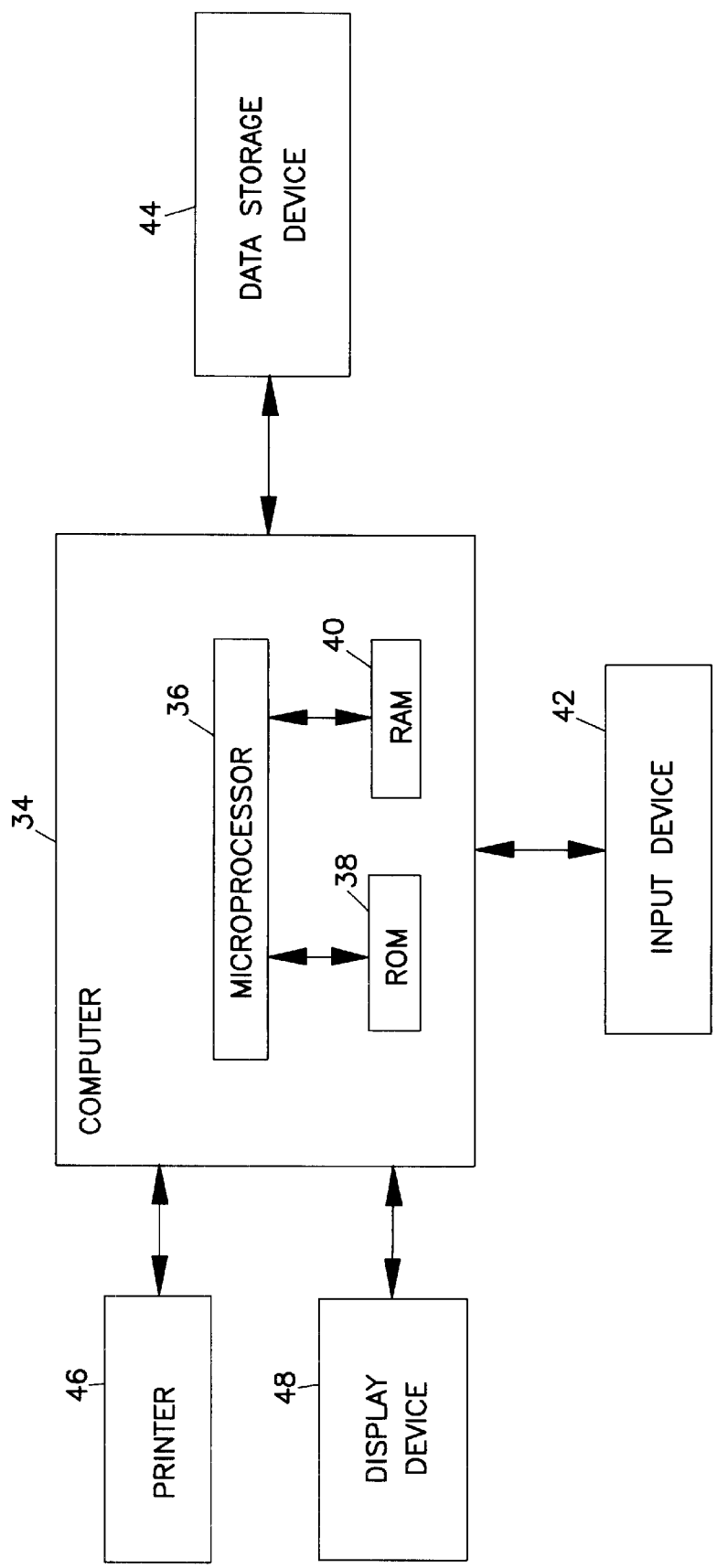
FIG. 8 is a diagram of typical hardware components for implementing the present invention.

FIG. 8 is a diagram of typical hardware components for implementing the present invention. The system includes a computer 34 which is a typical digital computer such as a personal computer. The computer 34 includes a microprocessor 36 for executing software programs. The microprocessor 36 is interfaced with a read only memory 38 and random access memory 40. The computer 34 is interfaced with an input device 42 for entering commands or information into the computer 34. The input device 42 may be implemented with, for example, a keyboard, "mouse" or other cursor control device, or other device for entering information or commands into the computer 34. The computer 34 is also typically interfaced with a printer 46, which may be implemented with a typical computer printer for generating a hard copy of the information stored within the computer 34, and is also interfaced with a display device 48, which may be implemented with a typical color or monochrome computer monitor. The computer 34 may also be interfaced to a data storage device 44 for storing information, or reading information from and writing information to a computer-readable storage medium such as a computer diskette. The data storage device 44 may include, for example, a digital audiotape drive, disk drive, hard disk drive, CD-ROM drive. Computer readable program code which causes a computer to execute the functionality of this invention may be stored in a device or medium to be read by the data storage device 44, or stored in the ROM 38 or RAM 40.

Figure 9:
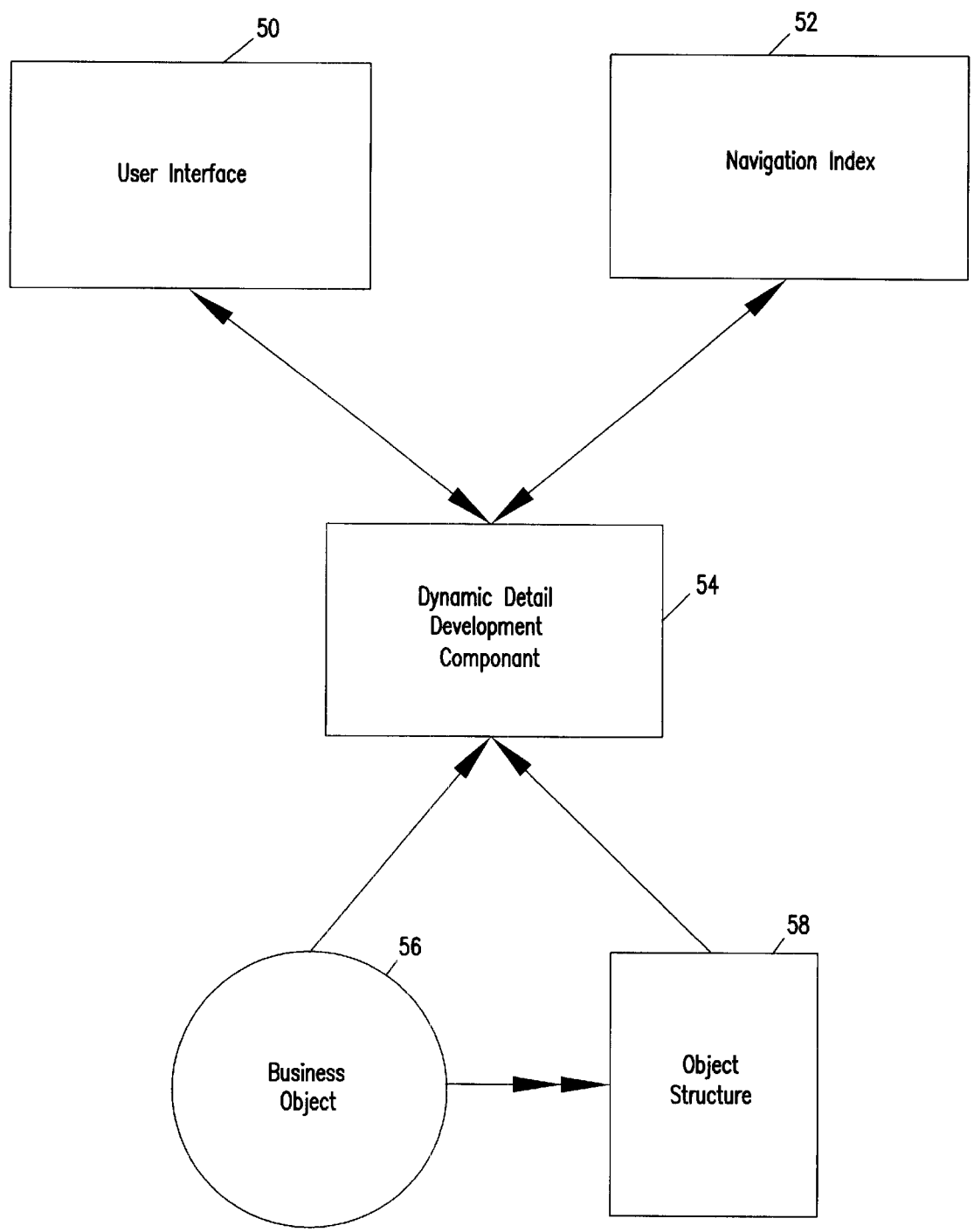
FIG. 9 is a diagram of typical modules used for implementing the present invention.

FIG. 9 is a diagram of typical modules used for implementing the present invention. A detail development component 54 receives information regarding at least one business object 56 and an object structure 58. The detail development component interacts with a navigation index 52 and user interface 50. In operation, the detail development component 54 receives an indication of a user-selected attribute, typically from the navigation index 54. The detail development component 54 then locates the selected attribute within the object structure 58 and displays an indication of the location of the attribute within a displayed object environment.

Figure 10:
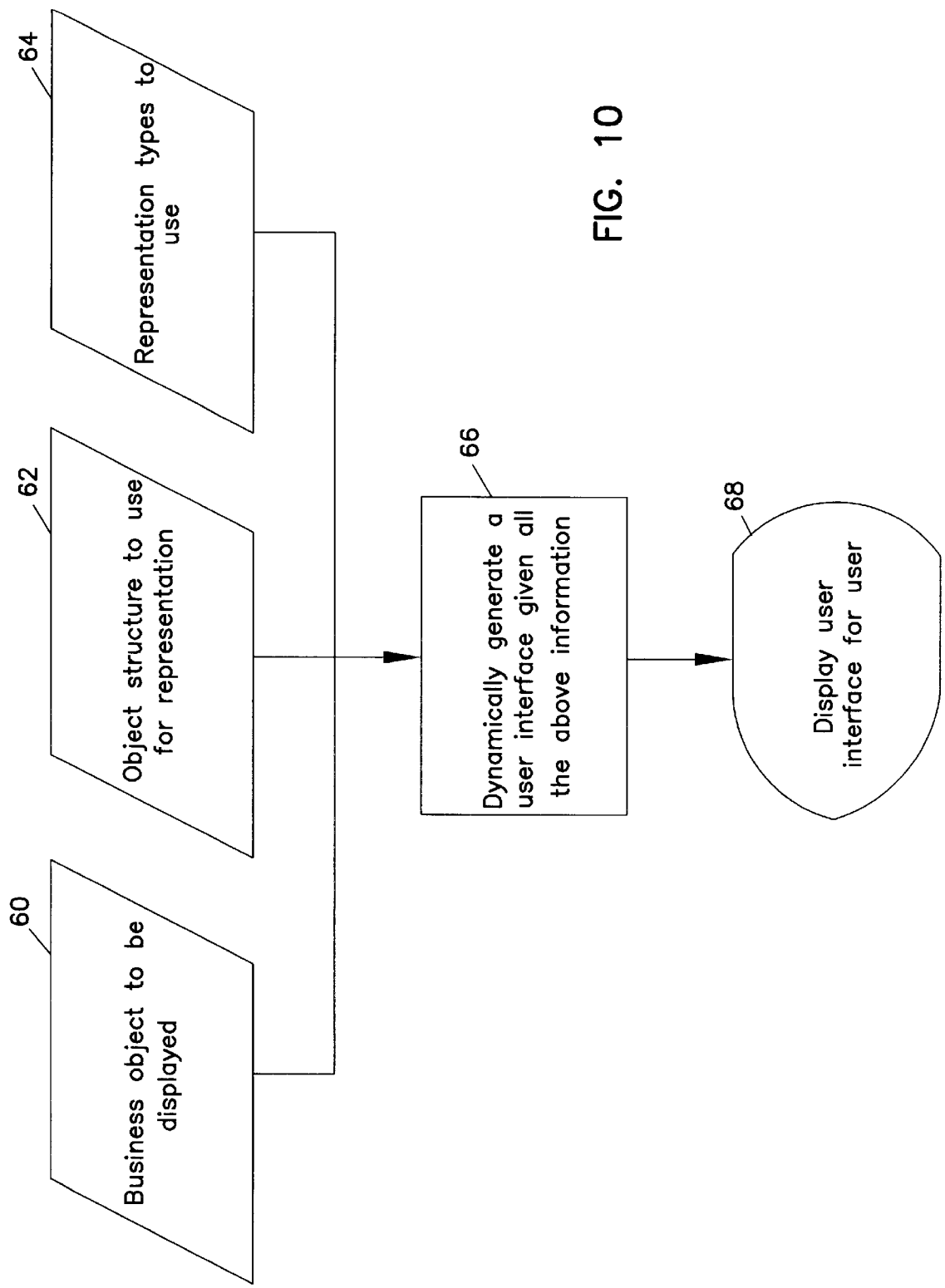
FIG. 10 is a flow chart showing preferred steps required to create a dynamic detail development component interface.

FIG. 10 is a flow chart showing preferred steps required to create a dynamic detail development component interface. There are typically three inputs to creating a dynamically generated user interface: a business object 60, an appropriate object structure 62, and a representation type 64. The detail development component uses this information to construct an appropriate representation for a user at step 66, and display the representation at step 68.

FIG. 11 is a flow chart illustrating how a navigation index constructs the index of attributes for display to the user. The navigation index requires two things: an object structure, and a development component that has the ability to navigate to a particular attribute. The navigation index retrieves information in the dynamic detail development component, including the business object and object structure (70). In particular, the user launches the navigation index from a detail development component, and the detail development component passes along to the newly created navigation index the current object structure being used for representing the business object. This object structure contains all of the attributes being viewed, arranged in hierarchical groupings. The navigation index takes the object structure, determines all of the attributes present on the business objects and creates a list of all the attributes present in the object structure (72), and displays the index (74) such as in the window shown in FIGS. 6 and 7. The navigation index is preferably selectively displayed in response to a user-entered signal, such as using a cursor-control device to "click on" a particular icon or menu item which controls display of the navigation index. While the list is shown in alphabetical order, the system can also construct the list at step 72 in other orders or according to particular categories, such as common function or type, e.g., financial, math, or educational. The navigation index also maintains a communication link to the detail development component.

FIG. 12 is a flow chart illustrating operation of the system for indicating a location of an attribute. After a user selects an attribute (76), the navigation index converts the selection to an actual attribute and relays the selection to the detail development component (78). The component finds the location of the attribute in the object structure hierarchy, and subsequently selects the appropriate field (80); it also changes the selected car button and selected tab if needed (82).

The following describes the relationship between dynamic screen generation and indexed tabs. The object structure is a hierarchical grouping of attributes on a business object. It is independent of any interface or representation. The dynamic screen generation interprets this object structure and creates a consistent view of the business object using the information within the structure. One of the views of a business object is to use tabs. Because of the object structure and the fact that dynamic screen generation uses the object structure in a consistent manner, the system knows where each attribute of the business object is located in the interface. The navigation index also uses the information in the object structure to determine which attributes are present in the view of the business object. It does not require that the views be dynamically generated, only that the development component responsible for maintaining that view can navigate to the proper attribute when the user selects it from the index.

While the present invention has been described in connection with a preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A system for navigating at least one object within a computer-implemented object environment, the system comprising:

object means for electronically specifying at least one object, the object having an object structure defining a hierarchy of particular attributes;

display means for displaying an object environment including a user interface generated as a function of representations of the object and the object structure, the representations specifying at least one type of a user interface element for displaying at least one of the particular attributes, and wherein the display means comprises means for displaying three levels of an object grouping; and location means for providing a visual indication of a location of a user-specified attribute within the displayed object environment.

2. A method for using a computer to navigate at least one object within a computer-implemented object environment, the method comprising:

electronically specifying at least one object, the object having an object structure defining a hierarchy of particular attributes;

displaying an object environment including a user interface generated as a function of representations of the object and the object structure, the representations specifying at least one type of a user interface element for displaying at least one of the particular attributes, and wherein displaying comprises displaying three levels of an object grouping; and providing a visual indication of a location of a user-specified attribute within the displayed object environment.

* * * * *